UNITED STATES PATENT OFFICE.

ARCHIBALD M. WHIPPLE, OF NORTH ADAMS, MASSACHUSETTS.

IMPROVEMENT IN WATER-PROOF FABRICS FOR CARRIAGE-TOPS AND FOR OTHER PURPOSES.

Specification forming part of Letters Patent No. 124,708, dated March 19, 1872; reissue No. 4,972, dated July 9, 1872.

*To all to whom it may concern:*

Be it known that I, ARCHIBALD M. WHIPPLE, of North Adams, in the county of Berkshire and State of Massachusetts, have invented certain new and useful Improvements in Water-Proof Goods; and do hereby declare the following to be a full, clear, and exact description thereof.

The ordinary enameled or rubber duck used for carriage tops, curtains, or other purposes, has a plain cotton back, and must be lined with broadcloth, damask, or other expensive material to produce the required finish, thus increasing the labor in putting such lining onto the enameled or rubber duck. The object of my invention is to dispense with this lining and extra labor and produce an enameled duck or rubber duck lined ready for use, all in one fabric, thereby reducing the cost fully one-half. The nature of my invention consists, first, in a new fabric, being all or part cotton on one side and wool, silk, or mixed material, that will hold a permanent dye, on the other side; and, second, in enameling such fabric with paint or rubber on the cotton side, thereby producing an article suitable for carriage tops, curtains, or other purposes, already lined.

In order to enable others skilled in the art to which my invention appertains to make and use the same, I will now proceed to describe the manner in which I propose to weave my fabric.

When the cloth is in the loom, I have a double warp—one of cotton and one of wool, silk, or other suitable material; or the warp may be all wool and the filling cotton, and so woven that the material holding a permanent color is thrown on one side and the cotton or its equivalent on the other side, and thus producing a single fabric, being all or part cotton on one side and all wool or other suitable material on the other side. This fabric, being enameled with paint or rubber on the cotton side, produces an article suitable for carriage tops, curtains, or other purposes, already lined.

The cotton or its equivalent in this fabric is just as necessary to produce firmness and hold the paint as the wool is to hold a permanent color; and as an all-wool surface will not hold paint as well as an all-cotton or part-cotton surface, the wool cannot be enameled, because the paint will not stick; neither can it be made firm enough without too much bulk, and firmness is absolutely necessary, or else the fabric will stretch and crack the enamel or paint; and as the cotton will not hold any color, the necessity for the combination made in my fabric is apparent.

Although my fabric is especially intended for carriage tops and curtains that heretofore have been lined with some material, it may be used for many other purposes; and as the lining is a part of the fabric itself it is not liable to be torn. The labor and expense are also very materially reduced.

Having thus fully described my invention, what I claim as new, and desire to secure by Letters Patent, is—

1. As a new article of manufacture, a single fabric, being all or part cotton on one side and all wool, silk, or other material that will hold a permanent dye on the other side, substantially as and for the purposes herein set forth.

2. As a new article of manufacture, an enameled or rubber duck, drill, muslin, or cloth, with a woolen or silk back, or their equivalents, or cotton-napped back woven with the fabric, so as to be not wholly exposed to the paint surface and yet form a perfect lining, substantially as and for the purposes herein set forth.

In testimony that I claim the foregoing I have hereunto set my hand this 23d day of May, 1872.

ARCHIBALD M. WHIPPLE.

Witnesses:
A. W. PRESTON,
WM. MCKAY.